(No Model.) 2 Sheets—Sheet 1.
S. E. BRETHERTON & F. C. MASON.
VEHICLE FOR CONVEYING SLAG POTS.
No. 441,788. Patented Dec. 2, 1890.
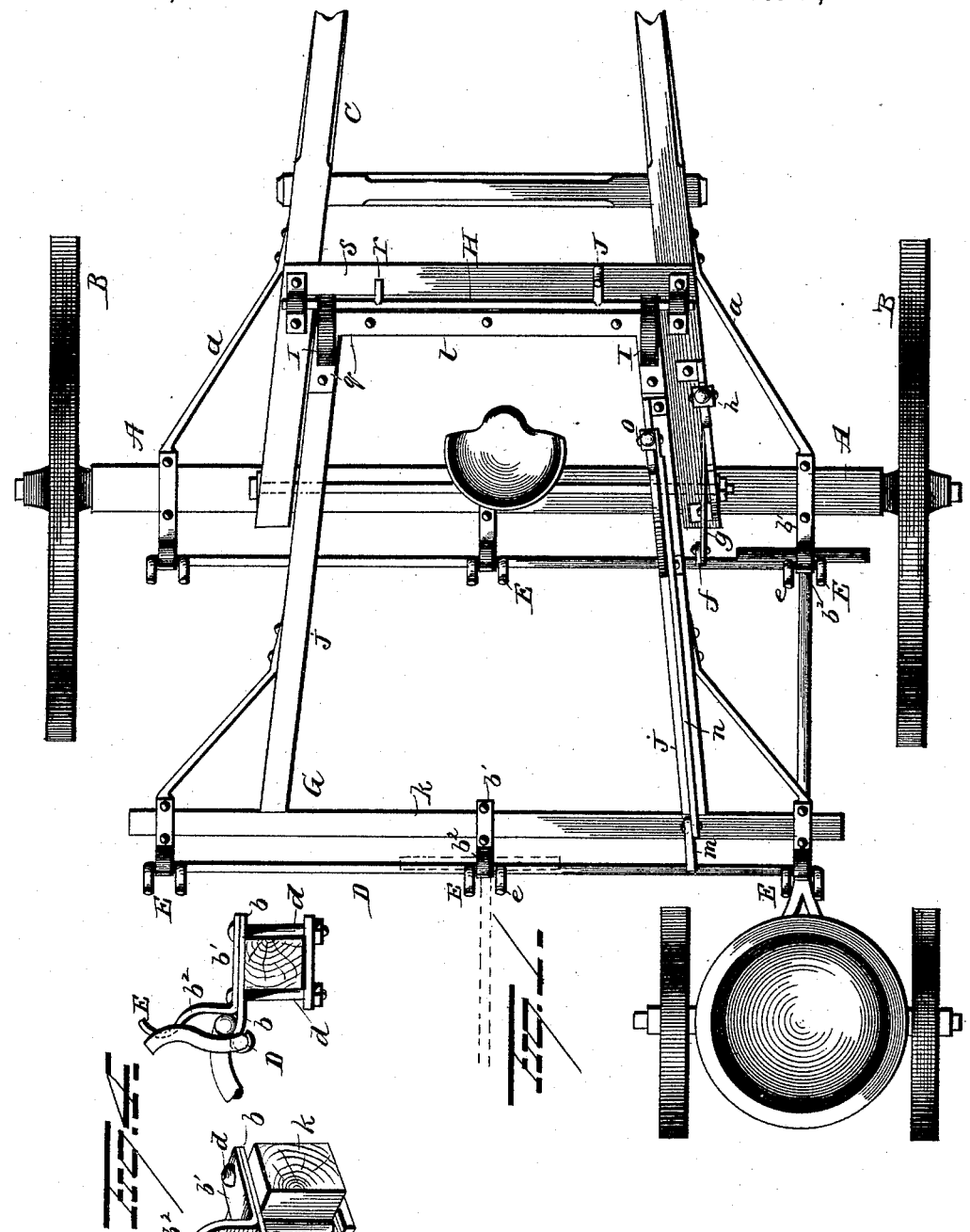

(No Model.) 2 Sheets—Sheet 2.
S. E. BRETHERTON & F. C. MASON.
VEHICLE FOR CONVEYING SLAG POTS.
No. 441,788. Patented Dec. 2, 1890.
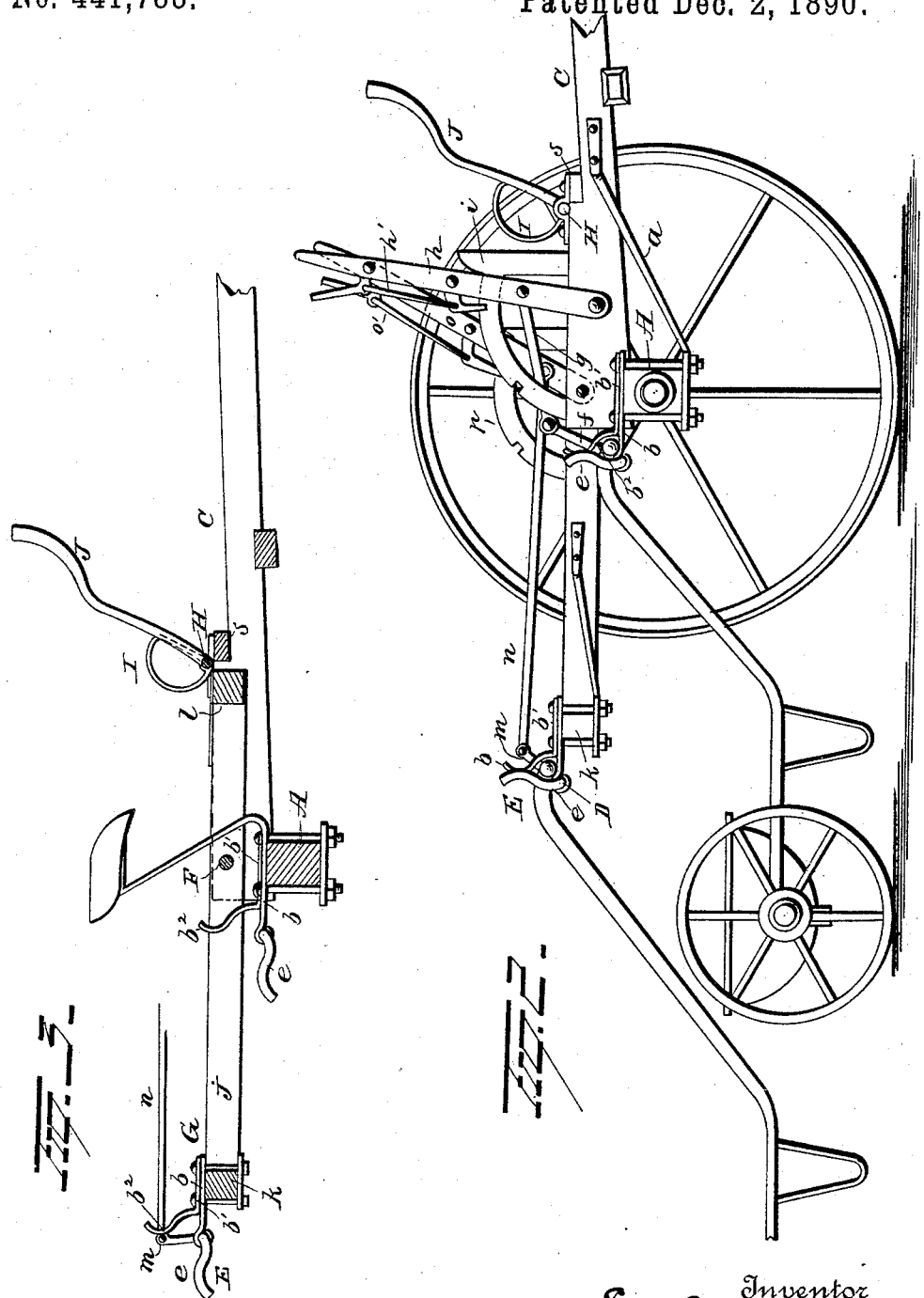

United States Patent Office.

SIDNEY E. BRETHERTON AND FRANK. C. MASON, OF LEADVILLE, COLORADO.

VEHICLE FOR CONVEYING SLAG-POTS.

SPECIFICATION forming part of Letters Patent No. 441,788, dated December 2, 1890.

Application filed September 6, 1890. Serial No. 364,181. (No model.)

*To all whom it may concern:*

Be it known that we, SIDNEY E. BRETHERTON and FRANK. C. MASON, of Leadville, in the county of Lake and State of Colorado, have invented certain new and useful Improvements in Vehicles for Conveying Slag-Pots; and we do hereby declare the following to be a full, clear, and exact description of the invention, such as will enable others skilled in the art to which it appertains to make and use the same.

Our invention relates to an improvement in vehicles, and more particularly to such as are especially adapted for use in conveying slag-pots, the object of the invention being to produce a vehicle by means of which a number of slag-pots may be conveyed from the furnace to the dump at one time, and thus effect great economy in time and labor.

A further object is to provide a vehicle for conveying slag-pots which shall be simple in construction, effective in operation, and easy to manipulate.

With these objects in view the invention consists in certain novel features of construction, and combinations and arrangements of parts, as hereinafter set forth, and pointed out in the claims.

In the accompanying drawings, Figure 1 is a view of our improvement, showing the manner of attaching a slag-pot thereto. Fig. 2 is a side view of the vehicle, showing the connections of the operating-levers. Fig. 3 is a sectional view. Figs. 4 are detached views of the clamps for receiving the tongue of the slag-pot.

The device is preferably made in the form of a two-wheeled vehicle, in which A represents the axle, having wheels B B at its ends, and shafts C, secured thereto between its ends. Secured to the shafts C, and projecting laterally and rearwardly therefrom, are brace-rods $a$, which terminate at their rear ends at points beneath the axle in proximity to the ends thereof. Two plates $b$ $b'$ are located on the axle at diametrically-opposite sides from the rearward termination of each brace-rod $a$, and are secured to said brace-rods and to the axle by means of bolts $d$, another pair of plates $b$ $b'$ being secured to the axle at or near its center. The plates $b$ project rearwardly from the axle and are provided with loops at their free ends, adapted to receive and form bearings for a horizontal shaft D, which runs parallel with the axle. The plates $b'$ are also projected rearwardly and provided with upturned curved arms $b^2$.

Projecting from the shaft D, at opposite sides of each plate $b$, are curved arms $e$, which, when the shaft D is rotated, are adapted to move upwardly at opposite sides of the arms $b^2$ of plates $b'$, thus forming a loop or clamp E between the arms $e$ and $b^2$, in which the T-shaped tongue of the slag-pot is adapted to be inserted, as explained farther on. An arm $f$ projects upwardly from the shaft D and has pivoted to its free end a bar $g$, the opposite end of the bar $g$ being pivotally connected to an operating-lever $h$, which latter is pivotally connected to one of the shafts C. The operating-lever $h$ is provided with a finger-bar $h'$, which engages the notches in a segment $i$, secured to the shafts. By this means the clamps E may be opened and closed, as desired.

Passing through the rear ends of the shafts C is a shaft F, on which is pivotally mounted, at points between its ends, a frame G, said frame comprising side bars $j$, end bar $k$, and forward cross-bar $l$. To the rear bar $k$ a series of clamps E are connected, said clamps being identical in their manner of construction and connection as the clamps E on the axle above described. An arm $m$ projects upwardly from the shaft D of this second series of clamps, and has pivotally connected to it one end of a rod or bar $n$, the other end of said rod or bar being pivoted to a lever $o$, pivoted to one end of the side bars of the frame G. This lever $o$, is provided with a finger-bar $o'$, adapted to engage notches in a quadrant $p$, secured to the frame G. Through the medium of this lever the second series of clamps may be manipulated.

The forward end of the frame G is preferably provided with a metallic plate $q$, and in proximity to the forward end of the frame a shaft H is journaled on the shafts C and adapted to lie parallel with the cross-bar $l$.

Secured to the shaft H in proximity to its ends are two eccentrics I, which, when the shaft is turned, are adapted to engage the plate on the forward end of the frame G, and lower the forward end of said frame, thus elevating the rear end thereof so that access may be had to the clamps on the axle.

To operate the eccentric shaft H a lever J is secured thereto, and in order to limit the movement of said shaft in one direction a short arm $r$ is secured to the shaft and adapted to engage a cross-bar $s$ on the shafts C.

A driver's seat is secured to the axle A, at or near the center thereof, and within easy reach of all the operating-levers.

To operate the device, the operator will first throw all the operating-levers rearwardly to their full extent, which operation will open all the clamps and elevate the rear end of the frame G, so that access may be had to the clamps on the axle. The T-shaped ends of the tongues of the wheeled slag-pots are then inserted in the clamps on the axle, and the lever $h$ operated to close said clamps, which latter will be locked by the finger-bar and quadrant connected with the operating-lever. The lever J is next operated to lower the rear end of the frame G, and then a series of slag-pots is connected to the clamps in the same manner as above explained, and the lever $o$ operated to close said clamps. When it is desired to release the slag-pot, it is simply necessary to operate the levers $h$ and $o$ to open the clamps E.

It is evident that the number of clamps E may be increased to accommodate any number of slag-pots.

Many slight changes might be made in the details of construction of our invention without departing from the spirit thereof or limiting its scope. Hence we do not wish to limit ourselves to the precise details of construction herein set forth; but, Having fully described our invention, what we claim as new, and desire to secure by Letters Patent, is—

1. The combination, with a vehicle for conveying slag-pots, of a series of clamps connected thereto and means for opening and closing the clamps simultaneously, substantially as set forth.

2. The combination, with a vehicle, of a series of clamps connected to the axle thereof, means for operating said clamps, a pivoted frame carrying a series of clamps, and means for operating said last-mentioned clamps, substantially as set forth.

3. The combination, with a vehicle, of a series of clamps connected with the axle thereof, means for operating said clamps, a pivoted frame carrying a series of clamps and means for operating the same, and devices for raising and lowering the pivoted frame, substantially as set forth.

4. The combination, with a vehicle, of a seat secured thereto, a series of clamps connected with the axle, means in proximity to the seat for operating said clamps, a pivoted frame carrying clamps and means in proximity to the seat for operating the last-mentioned clamps, and devices located near the seat for raising and lowering the pivoted frame, substantially as set forth.

5. The combination, with a vehicle, of a series of clamps, said clamps consisting of a fixed portion and a movable portion, the movable portion being connected to and adapted to move with a shaft, and mechanism for operating said shaft to open and close the clamps, substantially as set forth.

6. The combination, with a vehicle, of a series of clamps connected thereto, each clamp consisting of a fixed portion and a movable portion carried by the fixed portion, said movable portions being secured to a shaft, and means for operating said shaft, substantially as set forth.

7. The combination, with a vehicle, of a series of clamps connected thereto, each clamp consisting of a fixed portion and a movable portion, the movable portions being secured to a shaft, an arm secured to said shaft, a rod connected to said arm and a lever connected to said rod, and a quadrant for said lever, substantially as set forth.

8. The combination, with a vehicle, of a frame pivoted thereto at a point between its ends, a shaft on the vehicle-shafts in proximity to the forward end of the frame, eccentrics on said shaft adapted to engage the forward end of the frame, a lever secured to the shaft to operate it, whereby the eccentrics are made to engage the forward end of the frame to raise the rear end thereof, and a stop on said shaft for limiting its movements, substantially as set forth.

9. The combination, with a vehicle for conveying slag-pots, of slag-pots having handles thereon and clamps on the vehicle adapted to receive and hold the ends of said handles, substantially as set forth.

In testimony whereof we have signed this specification in the presence of two subscribing witnesses.

SIDNEY E. BRETHERTON.
FRANK. C. MASON.

Witnesses:
WILL. W. OFFICER,
E. C. WOODWARD.